United States Patent Office.

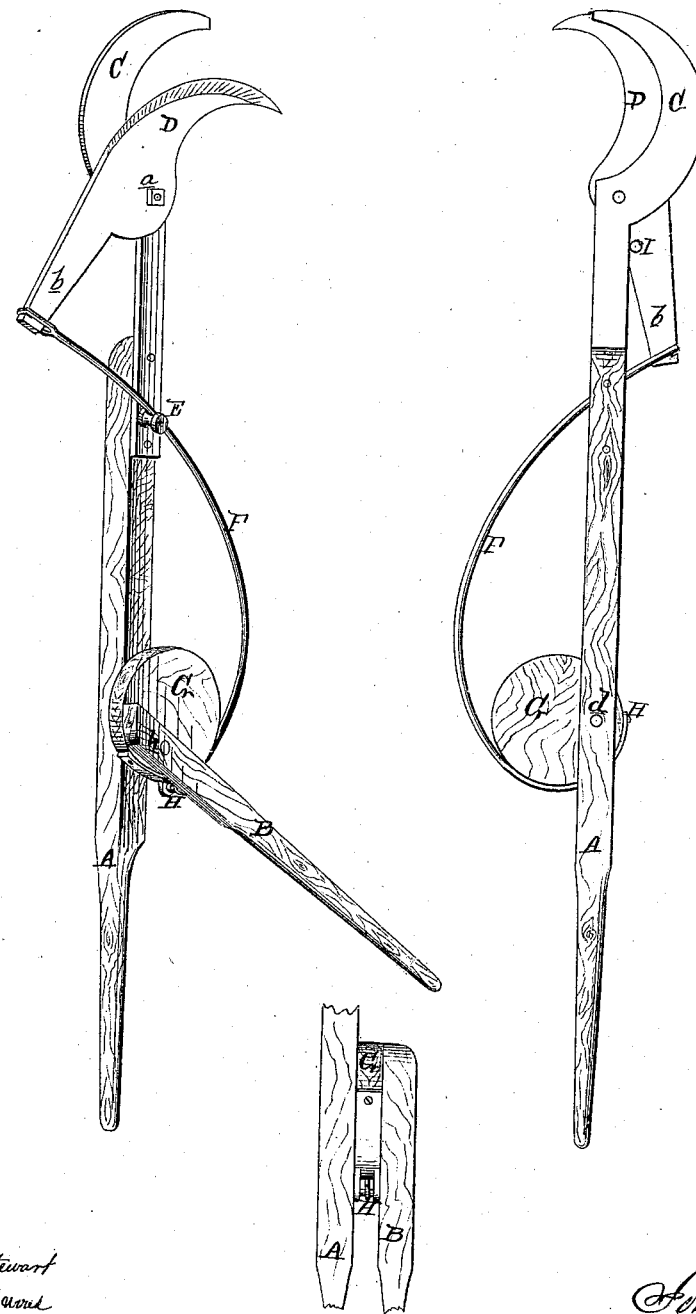

JOHN CALDER, OF MACEDON, NEW YORK.

Letters Patent No. 111,106, dated January 24, 1871.

IMPROVEMENT IN PRUNING-SHEARS.

The Schedule referred to in these Letters Patent and making part of the same.

*To whom it may concern:*

Be it known that I, JOHN CALDER, of Macedon, in the county of Wayne and State of New York, have invented a new and useful Improvement in Pruning-Shears; and I do declare that the following is a true and accurate description thereof, reference being had to the accompanying drawing and to the letters of reference marked thereon and being a part of this specification, in which—

Figure 1 is a perspective of the front side of my device.

Figure 2 is a perspective of the rear side of the same.

Figure 3 is an elevation, showing the method of attaching the lever-spring to the cam-wheel.

Like letters refer to like parts in each figure.

The nature of this invention relates to an improved construction of an implement for the purpose of pruning trees, trimming hedges, and other similar work.

The invention consists in a combination of all the parts to form a complete implement, as more fully hereinafter described.

In the accompanying drawing—

A represents a handle, to which is fastened rigidly the curved cutting-blade C.

To this cutting-blade is pivoted, by means of the bolt *a*, the cutting-blade D, which is of the form shown in fig. 1, and the blade D is provided with a prolongation, *b*, over the end of which the eye of the lever-spring is placed in a groove for the purpose.

This lever-spring passes over the friction-wheel E, which is fastened to the handle A in such a manner as to freely rotate upon its axis, and its opposite end is secured to the eccentric wheel or cam G by means of the hinge-joint H.

This eccentric wheel or cam H is pivoted at *d* to the handle A, and the handle B is rigidly fastened to said wheel or cam at *h*.

I is a small pin or stop, secured to the cutting-blade D in such a manner that, when the blades are closed, the stop will impinge against the shank of the cutting-blade C and prevent the blades from cutting by each other.

In fig. 1 the implement is shown ready for use, and in fig. 2 the blades are shown as closed.

What I claim as my invention, and desire to secure by Letters Patent, is—

The arrangement of the handles A B, the cutting-blades C D, spring-lever F, friction-wheel E, cam-wheel G, stop I, and hinge-joint H, when the parts are combined and operate as and for the purposes set forth.

JOHN CALDER.

Witnesses:
M. STEWART,
THOS. S. SPRAGUE.